United States Patent
Matsuo et al.

(10) Patent No.: US 12,352,338 B2
(45) Date of Patent: Jul. 8, 2025

(54) MULTI-SPEED TRANSMISSION

(71) Applicant: KOMATSU LTD., Tokyo (JP)

(72) Inventors: Taku Matsuo, Tokyo (JP); Nobuhito Yasuta, Tokyo (JP); Masaki Shiohara, Tokyo (JP); Michihiro Aida, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/702,882

(22) PCT Filed: Oct. 4, 2022

(86) PCT No.: PCT/JP2022/037059
§ 371 (c)(1),
(2) Date: Apr. 19, 2024

(87) PCT Pub. No.: WO2023/079886
PCT Pub. Date: May 11, 2023

(65) Prior Publication Data
US 2024/0410448 A1    Dec. 12, 2024

(30) Foreign Application Priority Data
Nov. 5, 2021 (JP) .................. 2021-181038

(51) Int. Cl.
*F16D 25/0638* (2006.01)
*F16H 3/66* (2006.01)

(52) U.S. Cl.
CPC ....... *F16H 3/66* (2013.01); *F16H 2200/2012* (2013.01); *F16H 2200/2046* (2013.01)

(58) Field of Classification Search
CPC ............... F16H 3/66; F16H 2200/2012; F16H 2200/2046; F16H 2200/0069; F16H 2200/0086
See application file for complete search history.

(56) References Cited

U.S. PATENT DOCUMENTS

| | | | |
|---|---|---|---|
| 8,979,701 | B2 | 3/2015 | Baldwin |
| 2006/0142112 | A1 | 6/2006 | Kamada et al. |

(Continued)

FOREIGN PATENT DOCUMENTS

| | | |
|---|---|---|
| DE | 102016001561 A1 | 8/2017 |
| DE | 102017206801 A1 | 10/2018 |

(Continued)

*Primary Examiner* — Farhana Pervin
(74) *Attorney, Agent, or Firm* — Faegre Drinker Biddle & Reath LLP (57) ABSTRACT

A multi-speed transmission includes: an input member; an output member; first to fourth planetary gear sets arranged in order in an axial direction from the input member toward the output member and each including a sun gear, a planetary carrier and a ring gear; first to third clutches; and first to third brakes. Each of the first to third clutches and the first to third brakes is operatively coupled to at least one planetary gear set of the planetary gear sets, and selectively engageable to produce a set of different gear ratios including at least ten forward gear ratios and at least two reverse gear ratios between the input member and the output member. The first clutch selectively couples the third sun gear of the third planetary gear set to the fourth planetary carrier of the fourth planetary gear set.

9 Claims, 4 Drawing Sheets

(56) References Cited

U.S. PATENT DOCUMENTS

| | | | |
|---|---|---|---|
| 2009/0048057 A1 | 2/2009 | Choi | |
| 2009/0062056 A1 | 3/2009 | Kato et al. | |
| 2013/0072343 A1 | 3/2013 | Shim et al. | |
| 2015/0031492 A1* | 1/2015 | Lippert | F16H 3/663 |
| | | | 475/275 |
| 2015/0267781 A1 | 9/2015 | Meyer et al. | |
| 2016/0369871 A1 | 12/2016 | Hwang et al. | |
| 2019/0078658 A1* | 3/2019 | Kwon | F16H 3/66 |
| 2019/0085944 A1* | 3/2019 | Yoo | F16H 3/66 |
| 2019/0085959 A1* | 3/2019 | Kwon | F16H 3/663 |
| 2020/0406739 A1* | 12/2020 | Singh | B60K 6/48 |

FOREIGN PATENT DOCUMENTS

| | | |
|---|---|---|
| JP | 2009-174643 A | 8/2009 |
| JP | 4375307 B2 | 12/2009 |
| JP | 4852933 B2 | 1/2012 |
| JP | 5034792 B2 | 9/2012 |
| JP | 5367253 B2 | 12/2013 |
| JP | 5954967 B2 | 7/2016 |
| JP | 2017-171258 A | 9/2017 |

\* cited by examiner

|     | SPEED REDUCTION RATIO | STEP RATIO | OVERALL STEP RATIO | CLUTCH | | | BRAKE | | |
|-----|------|------|------|-------|--------|-------|-------|--------|-------|
|     |      |      |      | FIRST | SECOND | THIRD | FIRST | SECOND | THIRD |
| F1  | 4.83 | 1.30 |      |       |        | X     | X     |        | X     |
| F2  | 3.71 | 1.33 |      |       |        | X     |       | X      | X     |
| F3  | 2.79 | 1.17 |      |       |        | X     | X     | X      |       |
| F4  | 2.39 | 1.25 |      |       | X      | X     |       | X      |       |
| F5  | 1.91 | 1.19 | 6.92 |       | X      |       | X     |        |       |
| F6  | 1.60 | 1.30 |      | X     |        | X     |       | X      |       |
| F7  | 1.23 | 1.23 |      | X     |        | X     | X     |        |       |
| F8  | 1.00 | 1.25 |      | X     | X      | X     |       |        |       |
| F9  | 0.80 | 1.14 |      | X     | X      |       |       | X      |       |
| F10 | 0.70 | –    |      | X     |        |       | X     | X      |       |
| R1  | –5.52 | 1.25 |     |       | X      |       |       | X      | X     |
| R2  | –4.40 | –   |      |       | X      |       | X     |        | X     |
| ADDITIONAL/ALTERNATIVE SPEED STAGE | | | | | | | | | |
| F9' | 0.83 | – | – | X | X | | X | | |

FIG.3

|  | TOOTH RATIO | PLANETARY TYPE |
|---|---|---|
| FIRST PLANETARY | 1.88 | SINGLE |
| SECOND PLANETARY | 2.31 | SINGLE |
| THIRD PLANETARY | 3.00 | SINGLE |
| FOURTH PLANETARY | 2.31 | SINGLE |

|  | TOOTH RATIO | PLANETARY TYPE |
|---|---|---|
| FIRST PLANETARY | 2.88 | DOUBLE |
| SECOND PLANETARY | 2.31 | SINGLE |
| THIRD PLANETARY | 3.00 | SINGLE |
| FOURTH PLANETARY | 2.31 | SINGLE |

|  | TOOTH RATIO | PLANETARY TYPE |
|---|---|---|
| FIRST PLANETARY | 1.88 | SINGLE |
| SECOND PLANETARY | 3.31 | DOUBLE |
| THIRD PLANETARY | 3.00 | SINGLE |
| FOURTH PLANETARY | 2.31 | SINGLE |

|  | TOOTH RATIO | PLANETARY TYPE |
| --- | --- | --- |
| FIRST PLANETARY | 1.88 | SINGLE |
| SECOND PLANETARY | 2.31 | SINGLE |
| THIRD PLANETARY | 4.00 | DOUBLE |
| FOURTH PLANETARY | 2.31 | SINGLE |

MULTI-SPEED TRANSMISSION

TECHNICAL FIELD

The present disclosure relates to a multi-speed transmission.

BACKGROUND ART

A work vehicle such as a dump truck is equipped with a multi-speed transmission having a plurality of planetary gear sets. The multi-speed transmission of the planetary gear type can obtain a desired speed reduction ratio by using an appropriate combination of rotational elements of each planetary gear set. A conventional multi-speed transmission that includes four planetary gear sets and six control elements and that can produce ten forward speeds and two reverse speeds is disclosed, for example, in U.S. Patent Application Publication No. 2015/0267781 (PTL 1).

CITATION LIST

Patent Literature

PTL 1: U.S. Patent Application Publication No. 2015/0267781

SUMMARY OF INVENTION

Technical Problem

In a multi-speed transmission, it is desired to reduce variation in step ratios for smooth shifting of speed stages.

The present disclosure proposes a multi-speed transmission capable of reducing variation in step ratios.

Solution to Problem

A multi-speed transmission according to an aspect of the present disclosure includes an input member and an output member. The multi-speed transmission includes not more than four planetary gear sets. The not more than four planetary gear sets include a first planetary gear set, a second planetary gear set, a third planetary gear set and a fourth planetary gear set that are arranged in order in an axial direction from the input member toward the output member. Each of the planetary gear sets includes a sun gear, a planetary carrier and a ring gear. The multi-speed transmission includes not more than six control elements. Each of the not more than six control elements is operatively coupled to at least one planetary gear set of the not more than four planetary gear sets, and selectively engageable to produce a set of different gear ratios between the input member and the output member. The set of different gear ratios includes at least ten forward gear ratios and at least two reverse gear ratios. One control element of the not more than six control elements selectively couples the sun gear of the third planetary gear set to the planetary carrier of the fourth planetary gear set.

Advantageous Effects of Invention

According to the multi-speed transmission of the present disclosure, variation in step ratios can be reduced.

DESCRIPTION OF EMBODIMENTS

Each embodiment of a multi-speed transmission 100 will be described below with reference to the drawings. The same or corresponding parts are denoted by the same reference characters in each embodiment described below, and the same description may not be repeated.

Embodiment 1

Figure 1:
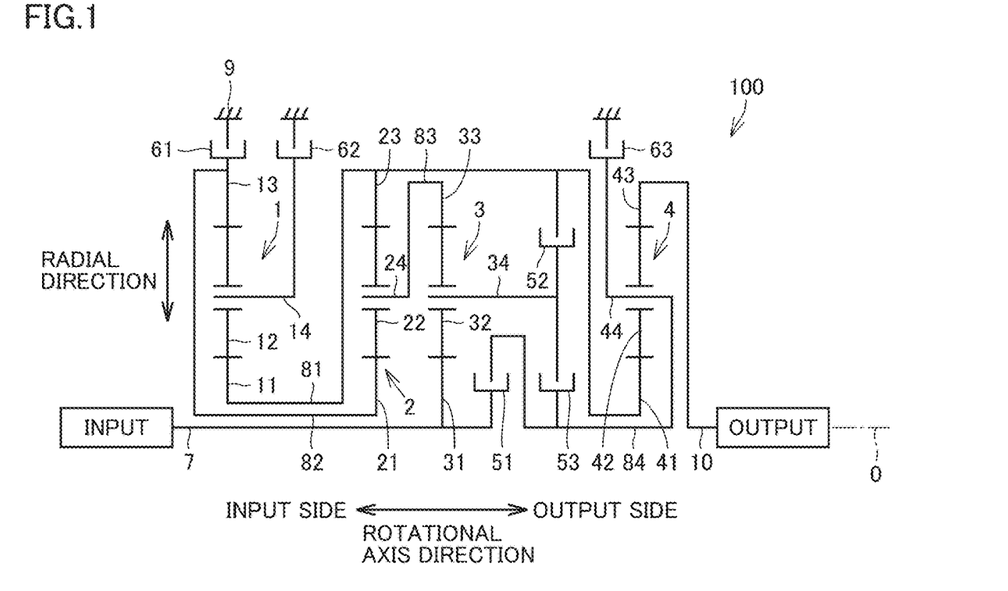
FIG. 1 is a schematic diagram of a multi-speed transmission according to Embodiment 1.

FIG. 1 is a schematic diagram of multi-speed transmission 100 according to Embodiment 1. Multi-speed transmission 100 changes a rotational speed of motive power that is input from any drive source (not shown), such as an internal combustion engine which is typically a diesel engine, or an electric motor, and outputs the motive power. The motive power from the drive source may be input to multi-speed transmission 100 through a torque converter.

Multi-speed transmission 100 includes a plurality of planetary gear sets 1 to 4, a plurality of clutches 51 to 53, a plurality of brakes 61 to 63, an input member 7, a first intermediate coupling member 81, a second intermediate coupling member 82, a third intermediate coupling member 83, a fourth intermediate coupling member 84, an output member 10, and a housing 9. Each of planetary gear sets 1 to 4, each of clutches 51 to 53, each of brakes 61 to 63, input member 7, first intermediate coupling member 81, second intermediate coupling member 82, third intermediate coupling member 83, fourth intermediate coupling member 84, and output member 10 are contained in housing 9.

In the following description, a rotational axis O represents the center line of input member 7 and output member 10. A rotational axis direction represents the direction in which rotational axis O extends. A radial direction represents the radial direction of a circle centered on rotational axis O. In FIG. 1 and subsequent FIGS. 4, 6 and 8, the rotational axis direction is the lateral direction in the figures, and the radial direction is the vertical direction in the figures. An input side represents the side of multi-speed transmission 100 that receives motive power. An output side represents the side of multi-speed transmission 100 that outputs motive power. In FIG. 1 and subsequent FIGS. 4, 6 and 8, the input side is the left side in the figures, and the output side is the right side in the figures.

The plurality of planetary gear sets include a first planetary gear set 1, a second planetary gear set 2, a third planetary gear set 3, and a fourth planetary gear set 4. The plurality of clutches include a first clutch 51, a second clutch 52, and a third clutch 53. The plurality of brakes include a first brake 61, a second brake 62, and a third brake 63. Each of clutches 51 to 53 and brakes 61 to 63 corresponds to a control element of the embodiments. The six control elements include first clutch 51, second clutch 52, third clutch 53, first brake 61, second brake 62, and third brake 63.

First planetary gear set 1, second planetary gear set 2, third planetary gear set 3, and fourth planetary gear set 4 are supported to be rotatable about rotational axis O. First planetary gear set 1, second planetary gear set 2, third planetary gear set 3, and fourth planetary gear set 4 are arranged in this order along the rotational axis direction. Specifically, they are arranged in the order of first planetary gear set 1, second planetary gear set 2, third planetary gear set 3, and fourth planetary gear set 4 from the input side to the output side.

Input member 7 is configured to rotate about rotational axis O. Motive power from the drive source such as an engine is input to input member 7.

First intermediate coupling member 81 is configured to rotate about rotational axis O. First intermediate coupling member 81 has a portion extending in the rotational axis direction. A center line of first intermediate coupling member 81 and the center line of input member 7 are substantially the same.

Second intermediate coupling member 82 is configured to rotate about rotational axis O. Second intermediate coupling member 82 has a portion extending in the rotational axis direction. The portion of second intermediate coupling member 82 extending in the rotational axis direction is arranged inward in the radial direction relative to the portion of first intermediate coupling member 81 extending in the rotational axis direction. A center line of second intermediate coupling member 82 and the center line of input member 7 are substantially the same.

Third intermediate coupling member 83 is configured to rotate about rotational axis O. Third intermediate coupling member 83 has a portion extending in the rotational axis direction. A center line of third intermediate coupling member 83 and the center line of input member 7 are substantially the same.

Fourth intermediate coupling member 84 is configured to rotate about rotational axis O. Fourth intermediate coupling member 84 has a portion extending in the rotational axis direction. A center line of fourth intermediate coupling member 84 and the center line of input member 7 are substantially the same.

First planetary gear set 1 is a single-pinion type planetary gear mechanism. First planetary gear set 1 includes, as rotational elements, a first sun gear 11, a plurality of first planetary gears 12, a first ring gear 13, and a first planetary carrier 14.

First sun gear 11 is arranged to be rotatable about rotational axis O. First sun gear 11 is arranged outward of input member 7 in the radial direction. Specifically, first sun gear 11 is annular, and input member 7 extends through first sun gear 11. First sun gear 11 and input member 7 can rotate relative to each other.

First sun gear 11 is configured to rotate integrally with first intermediate coupling member 81. Specifically, first sun gear 11 is fixed to first intermediate coupling member 81. First sun gear 11 and first intermediate coupling member 81 may be formed of a single member.

Each of first planetary gears 12 is configured to mesh with first sun gear 11. Each of first planetary gears 12 is arranged outward of first sun gear 11 in the radial direction. Specifically, first planetary gears 12 are spaced from one another in a circumferential direction.

Each of first planetary gears 12 is configured to revolve about first sun gear 11. Each of first planetary gears 12 is configured to rotate about rotational axis O. Each of first planetary gears 12 is also configured to rotate about its own axis.

First ring gear 13 meshes with each of first planetary gears 12. First ring gear 13 is configured to rotate about rotational axis O.

First ring gear 13 is configured to rotate integrally with second intermediate coupling member 82. Specifically, first ring gear 13 is fixed to second intermediate coupling member 82. First ring gear 13 and second intermediate coupling member 82 may be formed of a single member.

First planetary carrier 14 supports each of first planetary gears 12. Each of first planetary gears 12 can rotate about its own axis while being supported by first planetary carrier 14. First planetary carrier 14 is configured to rotate about rotational axis O.

Second planetary gear set 2 is a single-pinion type planetary gear mechanism. Second planetary gear set 2 includes, as rotational elements, a second sun gear 21, a plurality of second planetary gears 22, a second ring gear 23, and a second planetary carrier 24.

Second sun gear 21 is configured to be rotatable about rotational axis O. Second sun gear 21 is arranged outward of input member 7 in the radial direction. Specifically, second sun gear 21 is annular, and input member 7 extends through second sun gear 21. Second sun gear 21 and input member 7 can rotate relative to each other.

Second sun gear 21 is configured to rotate integrally with second intermediate coupling member 82. Specifically, second sun gear 21 is fixed to second intermediate coupling member 82. Second sun gear 21 and second intermediate coupling member 82 may be formed of a single member. Second intermediate coupling member 82 couples first ring gear 13 of first planetary gear set 1 to second sun gear 21 of second planetary gear set 2. First ring gear 13 and second sun gear 21 are configured to rotate integrally with each other.

Each of second planetary gears 22 is configured to mesh with second sun gear 21. Each of second planetary gears 22 is arranged outward of second sun gear 21 in the radial direction. Specifically, second planetary gears 22 are spaced from one another in the circumferential direction.

Each of second planetary gears 22 is configured to revolve about second sun gear 21. Each of second planetary gears 22 is configured to rotate about rotational axis O. Each of second planetary gears 22 is also configured to rotate about its own axis.

Second ring gear 23 meshes with each of second planetary gears 22. Second ring gear 23 is configured to rotate about rotational axis O.

Second ring gear 23 is configured to rotate integrally with first intermediate coupling member 81. Specifically, second ring gear 23 is fixed to first intermediate coupling member 81. Second ring gear 23 and first intermediate coupling member 81 may be formed of a single member.

Second planetary carrier 24 supports each of second planetary gears 22. Each of second planetary gears 22 can rotate about its own axis while being supported by second planetary carrier 24. Second planetary carrier 24 is configured to rotate about rotational axis O.

Second planetary carrier 24 is configured to rotate integrally with third intermediate coupling member 83. Specifically, second planetary carrier 24 is fixed to third intermediate coupling member 83. Second planetary carrier 24 and third intermediate coupling member 83 may be formed of a single member.

Third planetary gear set 3 is a single-pinion type planetary gear mechanism. Third planetary gear set 3 includes, as rotational elements, a third sun gear 31, a plurality of third planetary gears 32, a third ring gear 33, and a third planetary carrier 34.

Third sun gear 31 is configured to rotate integrally with input member 7. Specifically, third sun gear 31 is fixed to input member 7. Input member 7 is coupled to third sun gear 31 of third planetary gear set 3. Third sun gear 31 and input member 7 may be formed of a single member.

Each of third planetary gears 32 is configured to mesh with third sun gear 31. Each of third planetary gears 32 is arranged outward of third sun gear 31 in the radial direction. Specifically, third planetary gears 32 are spaced from one another in the circumferential direction.

Each of third planetary gears 32 is configured to revolve about third sun gear 31. Each of third planetary gears 32 is configured to rotate about rotational axis O. Each of third planetary gears 32 is also configured to rotate about its own axis.

Third ring gear 33 meshes with each of third planetary gears 32. Third ring gear 33 is configured to rotate about rotational axis O.

Third ring gear 33 is configured to rotate integrally with third intermediate coupling member 83. Specifically, third ring gear 33 is fixed to third intermediate coupling member 83. Third ring gear 33 and third intermediate coupling member 83 may be formed of a single member. Third intermediate coupling member 83 couples second planetary carrier 24 of second planetary gear set 2 to third ring gear 33 of third planetary gear set 3. Second planetary carrier 24 and third ring gear 33 are configured to rotate integrally with each other.

Third planetary carrier 34 supports each of third planetary gears 32. Each of third planetary gears 32 can rotate about its own axis while being supported by third planetary carrier 34. Third planetary carrier 34 is configured to rotate about rotational axis O.

Fourth planetary gear set 4 is a single-pinion type planetary gear mechanism. Fourth planetary gear set 4 includes, as rotational elements, a fourth sun gear 41, a plurality of fourth planetary gears 42, a fourth ring gear 43, and a fourth planetary carrier 44.

Fourth sun gear 41 is annular, and is arranged to be rotatable about rotational axis O. Fourth sun gear 41 is configured to rotate integrally with first intermediate coupling member 81. Specifically, fourth sun gear 41 is fixed to first intermediate coupling member 81. Fourth sun gear 41 and first intermediate coupling member 81 may be formed of a single member. First intermediate coupling member 81 couples first sun gear 11 of first planetary gear set 1, second ring gear 23 of second planetary gear set 2, and fourth sun gear 41 of fourth planetary gear set 4 to one another. First sun gear 11, second ring gear 23 and fourth sun gear 41 are configured to rotate integrally with one another.

Each of fourth planetary gears 42 is configured to mesh with fourth sun gear 41. Each of fourth planetary gears 42 is arranged outward of fourth sun gear 41 in the radial direction. Specifically, fourth planetary gears 42 are spaced from one another in the circumferential direction.

Each of fourth planetary gears 42 is configured to revolve about fourth sun gear 41. Each of fourth planetary gears 42 is configured to rotate about rotational axis O. Each of fourth planetary gears 42 is also configured to rotate about its own axis.

Fourth ring gear 43 meshes with each of fourth planetary gears 42. Fourth ring gear 43 is configured to rotate about rotational axis O.

Fourth ring gear 43 is configured to rotate integrally with output member 10. Fourth ring gear 43 is fixed to output member 10. Output member 10 is coupled to fourth ring gear 43 of fourth planetary gear set 4. Fourth ring gear 43 and output member 10 may be formed of a single member. Output member 10 outputs motive power. Specifically, output member 10 outputs motive power having a rotational speed that has been changed by multi-speed transmission 100.

Fourth planetary carrier 44 supports each of fourth planetary gears 42. Each of fourth planetary gears 42 can rotate about its own axis while being supported by fourth planetary carrier 44. Fourth planetary carrier 44 is configured to rotate about rotational axis O.

Fourth planetary carrier 44 is configured to rotate integrally with fourth intermediate coupling member 84. Specifically, fourth planetary carrier 44 is fixed to fourth intermediate coupling member 84. Fourth planetary carrier 44 and fourth intermediate coupling member 84 may be formed of a single member.

First clutch 51 is configured to selectively couple third sun gear 31 of third planetary gear set 3 to fourth intermediate coupling member 84. First clutch 51 is configured to selectively couple third sun gear 31 to fourth planetary carrier 44 of fourth planetary gear set 4. First clutch 51 is a hydraulic clutch mechanism, for example, and can be formed of a plurality of discs.

When engaged, first clutch 51 couples third sun gear 31 to fourth intermediate coupling member 84. When engaged, first clutch 51 couples third sun gear 31 to fourth planetary carrier 44 through fourth intermediate coupling member 84. Thus, third sun gear 31 and fourth planetary carrier 44 rotate integrally. When released, first clutch 51 releases the coupling between third sun gear 31 and fourth intermediate coupling member 84. Thus, third sun gear 31 and fourth planetary carrier 44 can rotate relative to each other.

Second clutch 52 is configured to selectively couple third planetary carrier 34 of third planetary gear set 3 to first intermediate coupling member 81. Second clutch 52 is configured to selectively couple third planetary carrier 34 to first sun gear 11, second ring gear 23 and fourth sun gear 41. Second clutch 52 is a hydraulic clutch mechanism, for example, and can be formed of a plurality of discs.

When engaged, second clutch 52 couples third planetary carrier 34 to first intermediate coupling member 81. When engaged, second clutch 52 couples third planetary carrier 34 to first sun gear 11, second ring gear 23 and fourth sun gear 41 through first intermediate coupling member 81. Thus, third planetary carrier 34, first sun gear 11, second ring gear 23 and fourth sun gear 41 rotate integrally. When released, second clutch 52 releases the coupling between third planetary carrier 34 and first intermediate coupling member 81. Thus, third planetary carrier 34 can rotate relative to first sun gear 11, second ring gear 23 and fourth sun gear 41.

Third clutch 53 is configured to selectively couple third planetary carrier 34 of third planetary gear set 3 to fourth intermediate coupling member 84. Third clutch 53 is configured to selectively couple third planetary carrier 34 to fourth planetary carrier 44 of fourth planetary gear set 4.

Third clutch 53 is a hydraulic clutch mechanism, for example, and can be formed of a plurality of discs.

When engaged, third clutch 53 couples third planetary carrier 34 to fourth intermediate coupling member 84. When engaged, third clutch 53 couples third planetary carrier 34 to fourth planetary carrier 44 through fourth intermediate coupling member 84. Thus, third planetary carrier 34 and fourth planetary carrier 44 rotate integrally. When released, third clutch 53 releases the coupling between third planetary carrier 34 and fourth intermediate coupling member 84. Thus, third planetary carrier 34 and fourth planetary carrier 44 can rotate relative to each other.

First brake 61 is configured to selectively couple second intermediate coupling member 82 to housing 9. First brake 61 is configured to selectively couple first ring gear 13 of first planetary gear set 1 and second sun gear 21 of second planetary gear set 2 to housing 9.

When engaged, first brake 61 couples second intermediate coupling member 82 to housing 9. When engaged, first brake 61 couples first ring gear 13 to housing 9, and couples second sun gear 21 to housing 9. Engaged first brake 61 brakes rotation of first ring gear 13 and second sun gear 21, so as to prevent rotation of first ring gear 13 and second sun gear 21.

When released, first brake 61 releases the coupling between second intermediate coupling member 82 and housing 9. When released, first brake 61 releases the coupling between first ring gear 13 and housing 9, and releases the coupling between second sun gear 21 and housing 9. Released first brake 61 does not brake rotation of first ring gear 13 and second sun gear 21, so as to allow rotation of first ring gear 13 and second sun gear 21.

Second brake 62 is configured to selectively couple first planetary carrier 14 of first planetary gear set 1 to housing 9.

When engaged, second brake 62 couples first planetary carrier 14 to housing 9. Engaged second brake 62 brakes rotation of first planetary carrier 14, so as to prevent rotation of first planetary carrier 14. When released, second brake 62 releases the coupling between first planetary carrier 14 and housing 9. Released second brake 62 does not brake rotation of first planetary carrier 14, so as to allow rotation of first planetary carrier 14.

Third brake 63 is configured to selectively couple fourth planetary carrier 44 of fourth planetary gear set 4 to housing 9.

When engaged, third brake 63 couples fourth planetary carrier 44 to housing 9. Engaged third brake 63 brakes rotation of fourth planetary carrier 44, so as to prevent rotation of fourth planetary carrier 44. When released, third brake 63 releases the coupling between fourth planetary carrier 44 and housing 9. Released third brake 63 does not brake rotation of fourth planetary carrier 44, so as to allow rotation of fourth planetary carrier 44.

In multi-speed transmission 100 configured as described above, each of first to third clutches 51 to 53 and first to third brakes 61 to 63 is operatively coupled to at least one planetary gear set of first to fourth planetary gear sets 1 to 4. By selectively engaging first to third clutches 51 to 53 and first to third brakes 61 to 63 to control the rotation of the rotational elements of first to fourth planetary gear sets 1 to 4, a set of different gear ratios is produced between input member 7 and output member 10. The set of different gear ratios includes at least ten forward gear ratios and two reverse gear ratios.

Figure 2:
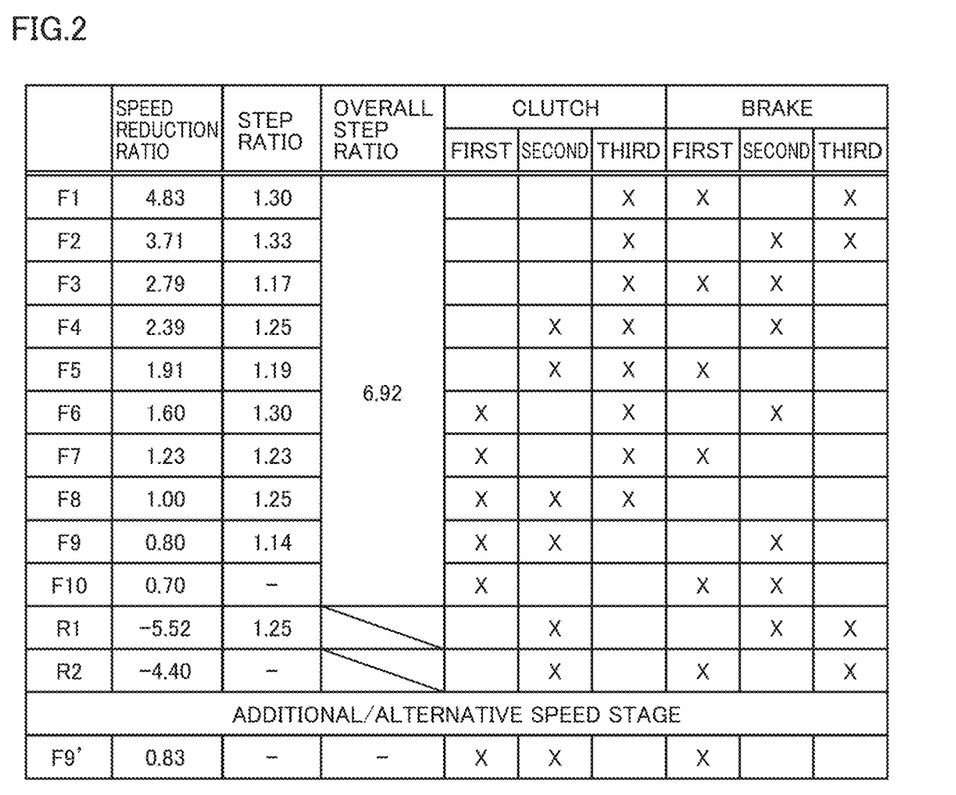
FIG. 2 is a table showing each clutch or each brake that is engaged for each speed stage of the multi-speed transmission.

FIG. 2 is a table showing each of clutches 51 to 53 or each of brakes 61 to 63 that is engaged for each speed stage of multi-speed transmission 100. FIG. 2 illustrates the states of operation of first to third clutches 51 to 53 and first to third brakes 61 to 63 corresponding to each speed stage. The symbol "X" in a column of each of first to third clutches 51 to 53 and first to third brakes 61 to 63 indicates that it is engaged, and a blank column indicates that it is released (disengaged).

To set the speed stage of multi-speed transmission 100 to the first forward speed stage (F1), third clutch 53, first brake 61 and third brake 63 are engaged, and first clutch 51, second clutch 52 and second brake 62 are released. Engaged third clutch 53 couples third planetary carrier 34 to fourth planetary carrier 44. Engaged first brake 61 brakes rotation of first ring gear 13 and second sun gear 21. Engaged third brake 63 brakes rotation of fourth planetary carrier 44.

To set the speed stage of multi-speed transmission 100 to the second forward speed stage (F2), third clutch 53, second brake 62 and third brake 63 are engaged, and first clutch 51, second clutch 52 and first brake 61 are released. Engaged third clutch 53 couples third planetary carrier 34 to fourth planetary carrier 44. Engaged second brake 62 brakes rotation of first planetary carrier 14. Engaged third brake 63 brakes rotation of fourth planetary carrier 44.

To set the speed stage of multi-speed transmission 100 to the third forward speed stage (F3), third clutch 53, first brake 61 and second brake 62 are engaged, and first clutch 51, second clutch 52 and third brake 63 are released. Engaged third clutch 53 couples third planetary carrier 34 to fourth planetary carrier 44. Engaged first brake 61 brakes rotation of first ring gear 13 and second sun gear 21. Engaged second brake 62 brakes rotation of first planetary carrier 14.

To set the speed stage of multi-speed transmission 100 to the fourth forward speed stage (F4), second clutch 52, third clutch 53 and second brake 62 are engaged, and first clutch 51, first brake 61 and third brake 63 are released. Engaged second clutch 52 couples third planetary carrier 34 to first sun gear 11, second ring gear 23 and fourth sun gear 41. Engaged third clutch 53 couples third planetary carrier 34 to fourth planetary carrier 44. Engaged second brake 62 brakes rotation of first planetary carrier 14.

To set the speed stage of multi-speed transmission 100 to the fifth forward speed stage (F5), second clutch 52, third clutch 53 and first brake 61 are engaged, and first clutch 51, second brake 62 and third brake 63 are released. Engaged second clutch 52 couples third planetary carrier 34 to first sun gear 11, second ring gear 23 and fourth sun gear 41. Engaged third clutch 53 couples third planetary carrier 34 to fourth planetary carrier 44. Engaged first brake 61 brakes rotation of first ring gear 13 and second sun gear 21.

To set the speed stage of multi-speed transmission 100 to the sixth forward speed stage (F6), first clutch 51, third clutch 53 and second brake 62 are engaged, and second clutch 52, first brake 61 and third brake 63 are released. Engaged first clutch 51 couples third sun gear 31 to fourth planetary carrier 44. Engaged third clutch 53 couples third planetary carrier 34 to fourth planetary carrier 44. Engaged second brake 62 brakes rotation of first planetary carrier 14.

To set the speed stage of multi-speed transmission 100 to the seventh forward speed stage (F7), first clutch 51, third clutch 53 and first brake 61 are engaged, and second clutch 52, second brake 62 and third brake 63 are released. Engaged first clutch 51 couples third sun gear 31 to fourth planetary carrier 44. Engaged third clutch 53 couples third planetary carrier 34 to fourth planetary carrier 44. Engaged first brake 61 brakes rotation of first ring gear 13 and second sun gear 21.

To set the speed stage of multi-speed transmission 100 to the eighth forward speed stage (F8), first clutch 51, second clutch 52 and third clutch 53 are engaged, and first brake 61, second brake 62 and third brake 63 are released. Engaged first clutch 51 couples third sun gear 31 to fourth planetary carrier 44. Engaged second clutch 52 couples third planetary carrier 34 to first sun gear 11, second ring gear 23 and fourth sun gear 41. Engaged third clutch 53 couples third planetary carrier 34 to fourth planetary carrier 44.

To set the speed stage of multi-speed transmission 100 to the ninth forward speed stage (F9), first clutch 51, second clutch 52 and second brake 62 are engaged, and third clutch 53, first brake 61 and third brake 63 are released. Engaged first clutch 51 couples third sun gear 31 to fourth planetary carrier 44. Engaged second clutch 52 couples third planetary carrier 34 to first sun gear 11, second ring gear 23 and fourth sun gear 41. Engaged second brake 62 brakes rotation of first planetary carrier 14.

To set the speed stage of multi-speed transmission 100 to the tenth forward speed stage (F10), first clutch 51, first brake 61 and second brake 62 are engaged, and second clutch 52, third clutch 53 and third brake 63 are released. Engaged first clutch 51 couples third sun gear 31 to fourth planetary carrier 44. Engaged first brake 61 brakes rotation of first ring gear 13 and second sun gear 21. Engaged second brake 62 brakes rotation of first planetary carrier 14.

To set the speed stage of multi-speed transmission 100 to the first reverse speed stage (R1), second clutch 52, second brake 62 and third brake 63 are engaged, and first clutch 51, third clutch 53 and first brake 61 are released. Engaged second clutch 52 couples third planetary carrier 34 to first sun gear 11, second ring gear 23 and fourth sun gear 41. Engaged second brake 62 brakes rotation of first planetary carrier 14. Engaged third brake 63 brakes rotation of fourth planetary carrier 44.

To set the speed stage of multi-speed transmission 100 to the second reverse speed stage (R2), second clutch 52, first brake 61 and third brake 63 are engaged, and first clutch 51, third clutch 53 and second brake 62 are released. Engaged second clutch 52 couples third planetary carrier 34 to first sun gear 11, second ring gear 23 and fourth sun gear 41. Engaged first brake 61 brakes rotation of first ring gear 13 and second sun gear 21. Engaged third brake 63 brakes rotation of fourth planetary carrier 44.

To set the speed stage of multi-speed transmission 100 to the ninth forward speed stage (F9'), which is an alternative speed stage, first clutch 51, second clutch 52 and first brake 61 are engaged, and third clutch 53, second brake 62 and third brake 63 are released. Engaged first clutch 51 couples third sun gear 31 to fourth planetary carrier 44. Engaged second clutch 52 couples third planetary carrier 34 to first sun gear 11, second ring gear 23 and fourth sun gear 41. Engaged first brake 61 brakes rotation of first ring gear 13 and second sun gear 21.

Here, the following relational expression holds for each of planetary gear sets 1 to 4, where "a" denotes the number of teeth of the sun gear, "b" denotes the number of teeth of the ring gear, "Na" denotes a rotational speed ratio of the sun gear, "Nb" denotes a rotational speed ratio of the ring gear, and "Nc" denotes a rotational speed ratio of the planetary carrier. Note that the rotational speed ratio of each gear refers to a ratio of the rotational speed of each gear to the rotational speed of input member 7.

$$a \cdot Na + b \cdot Nb = (a+b) \cdot Nc$$

Figure 3:
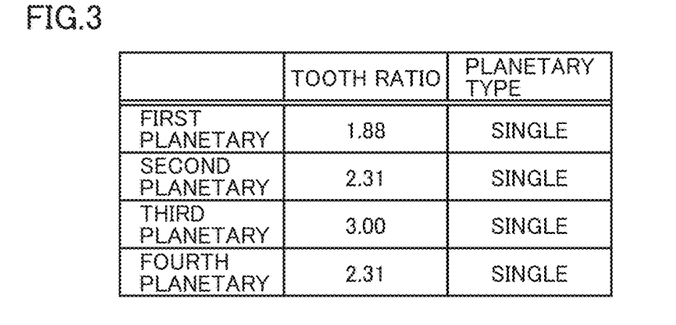
FIG. 3 is a table showing a tooth ratio in each planetary gear set of the multi-speed transmission according to Embodiment 1.

A ratio of the number of teeth of the ring gear to the number of teeth of the sun gear (tooth ratio) in each of planetary gear sets 1 to 4 is as shown in FIG. 3. Note that FIG. 3 is a table showing the tooth ratio in each of planetary gear sets 1 to 4 of multi-speed transmission 100 according to Embodiment 1.

A speed reduction ratio for each speed stage described above and shown in FIG. 2 can be determined using the above relational expression and the tooth ratio shown in FIG. 3.

Note that a step ratio shown in FIG. 2 represents a ratio between the speed reduction ratios of the respective speed stages. Specifically, the step ratio refers to a value determined by, for the speed reduction ratios of adjacent speed stages, dividing the speed reduction ratio of the lower speed stage by the speed reduction ratio of the higher speed stage. An overall step ratio refers to a value determined by dividing the speed reduction ratio of the lowest speed stage by the speed reduction ratio of the highest speed stage. Multi-speed transmission 100 of the present embodiment has ten forward speed stages. The overall step ratio of multi-speed transmission 100 of the present embodiment is a value determined by dividing the speed reduction ratio of the first forward speed stage by the speed reduction ratio of the tenth forward speed stage.

Multi-speed transmission 100 of the present embodiment has ten forward speed stages and two reverse speed stages. This can allow for improved fuel efficiency of a vehicle having multi-speed transmission 100 mounted thereon, and enhanced running performance of the vehicle having multi-speed transmission 100 mounted thereon.

In the present embodiment, multi-speed transmission 100 includes four planetary gear sets 1 to 4 and a total of six control elements (first to third clutches 51 to 53 and first to third brakes 61 to 63) in order to implement ten forward speed stages and two reverse speed stages. This can allow for weight reduction and downsizing of multi-speed transmission 100.

In multi-speed transmission 100 of the present embodiment, the overall step ratio shown in FIG. 2 is 6.92. This can allow for improved maximum traction force, and also improved maximum vehicle speed, of the vehicle having multi-speed transmission 100 mounted thereon.

In multi-speed transmission 100 of the present embodiment, the step ratios for the ten forward speed stages shown in FIG. 2 are within the range of from 1.14 to 1.33, which indicates reduced variation in step ratios. This can allow multi-speed transmission 100 to suppress shocks during gear shifts and to smoothly shift the speed stages.

Embodiment 2

Figure 4:
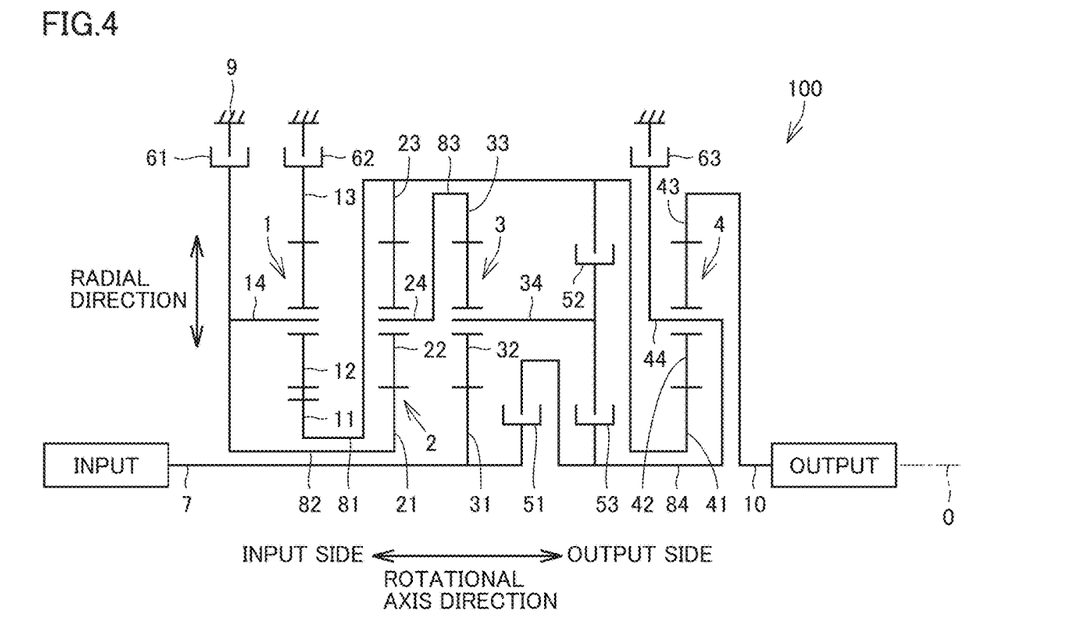
FIG. 4 is a schematic diagram of a multi-speed transmission according to Embodiment 2.
Figure 5:
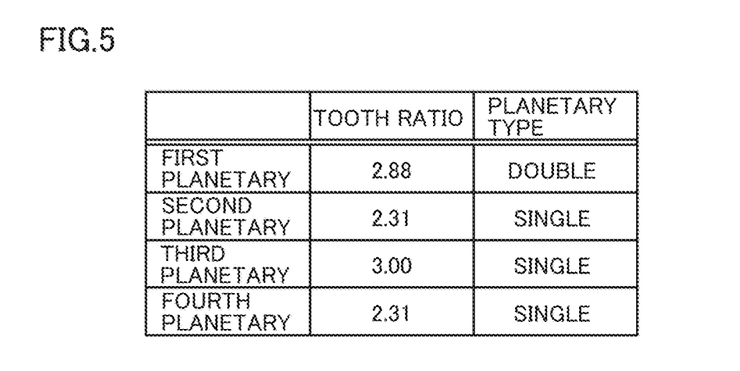
FIG. 5 is a table showing a tooth ratio in each planetary gear set of the multi-speed transmission according to Embodiment 2.

FIG. 4 is a schematic diagram of multi-speed transmission 100 according to Embodiment 2. FIG. 5 is a table showing a tooth ratio in each of planetary gear sets 1 to 4 of multi-speed transmission 100 according to Embodiment 2. The following description of Embodiment 2 does not repeat the description of the same configuration as that of Embodiment 1, but focuses on and describes a configuration that is different from Embodiment 1 and specific to Embodiment 2.

Multi-speed transmission 100 according to Embodiment 2 is different from Embodiment 1 in that not more than four planetary gear sets 1 to 4 include at least one double-pinion type planetary gear mechanism, as shown in FIG. 5. Specifically, in multi-speed transmission 100 according to Embodiment 2, first planetary gear set 1 is configured in the form of a double-pinion type planetary gear mechanism.

First planetary gear 12 of first planetary gear set 1 includes an inner pinion gear and an outer pinion gear. The inner pinion gear meshes with first sun gear 11. The outer pinion gear meshes with first ring gear 13. The inner pinion gear and the outer pinion gear also mesh with each other. The inner pinion gear is spaced inward from first ring gear 13 in the radial direction, and the outer pinion gear is spaced outward from first sun gear 11 in the radial direction. First planetary carrier 14 supports both the inner pinion gear and the outer pinion gear so that they can rotate about their own axes.

As shown in FIG. 4, first planetary carrier 14 is configured to rotate integrally with second intermediate coupling member 82. Specifically, first planetary carrier 14 is fixed to second intermediate coupling member 82. First planetary carrier 14 and second intermediate coupling member 82 may be formed of a single member. Second intermediate coupling member 82 couples first planetary carrier 14 of first planetary gear set 1 to second sun gear 21 of second planetary gear set 2. First planetary carrier 14 and second sun gear 21 are configured to rotate integrally with each other.

First brake 61 is configured to selectively couple first planetary carrier 14 of first planetary gear set 1 and second sun gear 21 of second planetary gear set 2 to housing 9.

When engaged, first brake 61 couples first planetary carrier 14 to housing 9, and couples second sun gear 21 to housing 9. Engaged first brake 61 brakes rotation of first planetary carrier 14 and second sun gear 21, so as to prevent rotation of first planetary carrier 14 and second sun gear 21. When released, first brake 61 releases the coupling between first planetary carrier 14 and housing 9, and releases the coupling between second sun gear 21 and housing 9. Released first brake 61 does not brake rotation of first planetary carrier 14 and second sun gear 21, so as to allow rotation of first planetary carrier 14 and second sun gear 21.

Second brake 62 is configured to selectively couple first ring gear 13 of first planetary gear set 1 to housing 9.

When engaged, second brake 62 couples first ring gear 13 to housing 9.

Engaged second brake 62 brakes rotation of first ring gear 13, so as to prevent rotation of first ring gear 13. When released, second brake 62 releases the coupling between first ring gear 13 and housing 9. Released second brake 62 does not brake rotation of first ring gear 13, so as to allow rotation of first ring gear 13.

By selectively engaging first to third clutches 51 to 53 and first to third brakes 61 to 63 to control the rotation of the rotational elements of first to fourth planetary gear sets 1 to 4 in a manner similar to FIG. 2, multi-speed transmission 100 of Embodiment 2 configured in this manner can also implement ten forward gear ratios and two reverse gear ratios. Multi-speed transmission 100 of Embodiment 2 can also produce the effect of reducing the variation in the step ratios of multi-speed transmission 100 in a manner similar to Embodiment 1.

Embodiment 3

Figure 6:
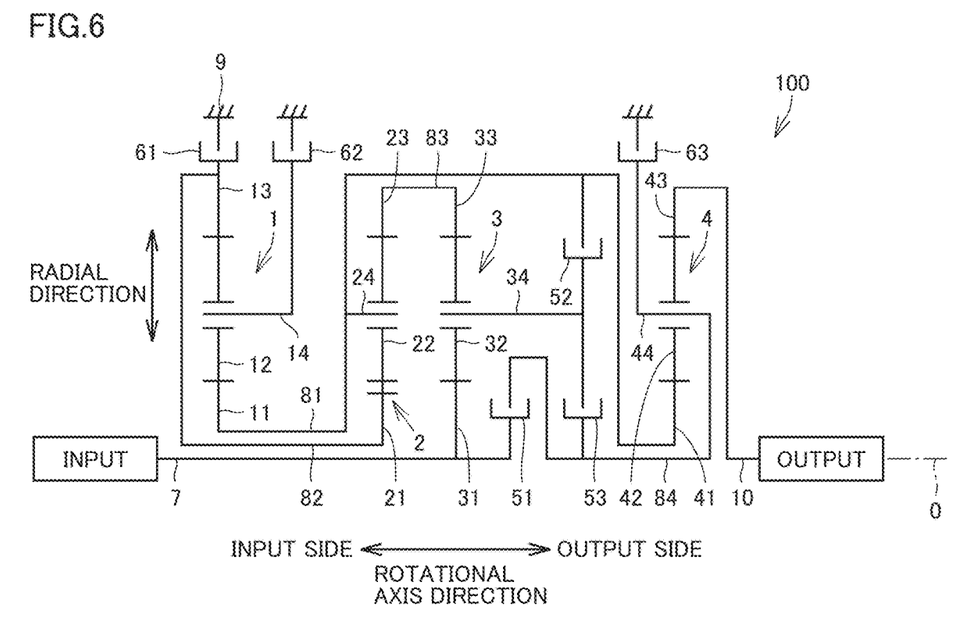
FIG. 6 is a schematic diagram of a multi-speed transmission according to Embodiment 3.
Figure 7:
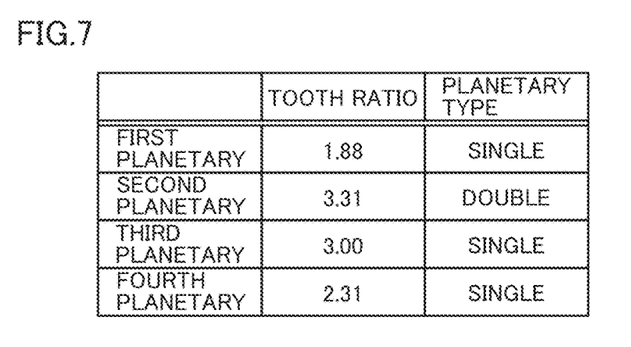
FIG. 7 is a table showing a tooth ratio in each planetary gear set of the multi-speed transmission according to Embodiment 3.

FIG. 6 is a schematic diagram of multi-speed transmission 100 according to Embodiment 3. FIG. 7 is a table showing a tooth ratio in each of planetary gear sets 1 to 4 of multi-speed transmission 100 according to Embodiment 3. The following description of Embodiment 3 does not repeat the description of the same configuration as that of Embodiment 1, but focuses on and describes a configuration that is different from Embodiment 1 and specific to Embodiment 3.

Multi-speed transmission 100 according to Embodiment 3 is different from Embodiment 1 in that not more than four planetary gear sets 1 to 4 include at least one double-pinion type planetary gear mechanism, as shown in FIG. 7. Specifically, in multi-speed transmission 100 according to Embodiment 3, second planetary gear set 2 is configured in the form of a double-pinion type planetary gear mechanism.

Second planetary gear 22 of second planetary gear set 2 includes an inner pinion gear and an outer pinion gear. The inner pinion gear meshes with second sun gear 21. The outer pinion gear meshes with second ring gear 23. The inner pinion gear and the outer pinion gear also mesh with each other. The inner pinion gear is spaced inward from second ring gear 23 in the radial direction, and the outer pinion gear is spaced outward from second sun gear 21 in the radial direction. Second planetary carrier 24 supports both the inner pinion gear and the outer pinion gear so that they can rotate about their own axes.

As shown in FIG. 6, second planetary carrier 24 is configured to rotate integrally with first intermediate coupling member 81. Specifically, second planetary carrier 24 is fixed to first intermediate coupling member 81. Second planetary carrier 24 and first intermediate coupling member 81 may be formed of a single member. First intermediate coupling member 81 couples first sun gear 11 of first planetary gear set 1, second planetary carrier 24 of second planetary gear set 2, and fourth sun gear 41 of fourth planetary gear set 4 to one another. First sun gear 11, second planetary carrier 24 and fourth sun gear 41 are configured to rotate integrally with one another.

Second ring gear 23 is configured to rotate integrally with third intermediate coupling member 83. Specifically, second ring gear 23 is fixed to third intermediate coupling member 83. Second ring gear 23 and third intermediate coupling member 83 may be formed of a single member. Third intermediate coupling member 83 couples second ring gear 23 of second planetary gear set 2 to third ring gear 33 of third planetary gear set 3. Second ring gear 23 and third ring gear 33 are configured to rotate integrally with each other.

Second clutch 52 is configured to selectively couple third planetary carrier 34 to first sun gear 11, second planetary carrier 24 and fourth sun gear 41.

When engaged, second clutch 52 couples third planetary carrier 34 to first sun gear 11, second planetary carrier 24 and fourth sun gear 41 through first intermediate coupling member 81. Thus, third planetary carrier 34, first sun gear 11, second planetary carrier 24 and fourth sun gear 41 rotate integrally. When released, second clutch 52 releases the coupling between third planetary carrier 34 and first intermediate coupling member 81. Thus, third planetary carrier 34 can rotate relative to first sun gear 11, second planetary carrier 24 and fourth sun gear 41.

By selectively engaging first to third clutches 51 to 53 and first to third brakes 61 to 63 to control the rotation of the rotational elements of first to fourth planetary gear sets 1 to 4 in a manner similar to FIG. 2, multi-speed transmission 100 of Embodiment 3 configured in this manner can also implement ten forward gear ratios and two reverse gear ratios. Multi-speed transmission 100 of Embodiment 3 can also produce the effect of reducing the variation in the step ratios of multi-speed transmission 100 in a manner similar to Embodiment 1.

Embodiment 4

Figure 8:
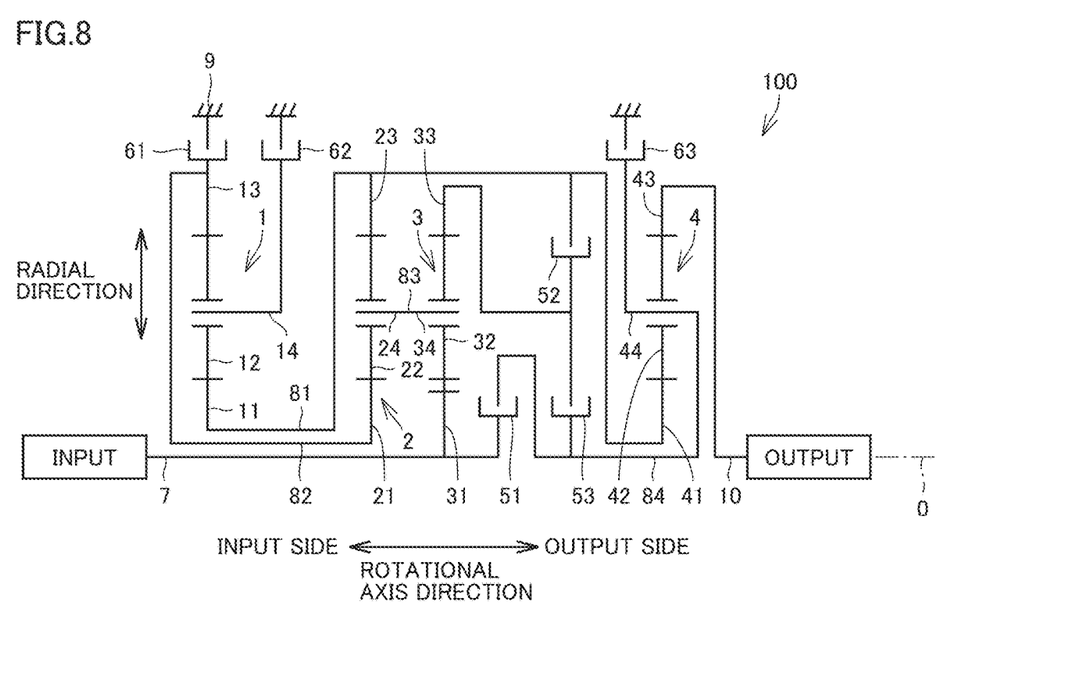
FIG. 8 is a schematic diagram of a multi-speed transmission according to Embodiment 4.
Figure 9:
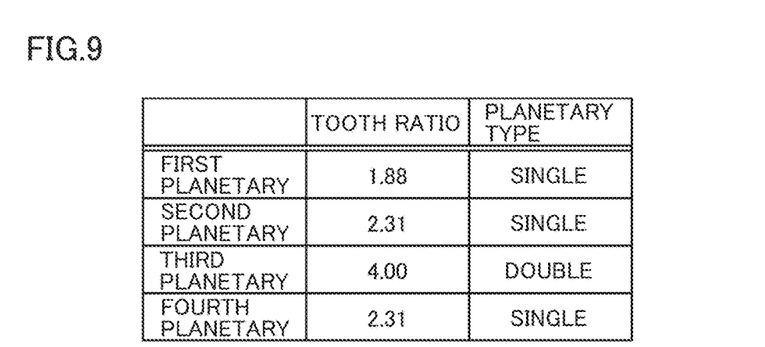
FIG. 9 is a table showing a tooth ratio in each planetary gear set of the multi-speed transmission according to Embodiment 4.

FIG. 8 is a schematic diagram of multi-speed transmission 100 according to Embodiment 4. FIG. 9 is a table showing a tooth ratio in each of planetary gear sets 1 to 4 of multi-speed transmission 100 according to Embodiment 4.

The following description of Embodiment 4 does not repeat the description of the same configuration as that of Embodiment 1, but focuses on and describes a configuration that is different from Embodiment 1 and specific to Embodiment 4.

Multi-speed transmission 100 according to Embodiment 2 is different from Embodiment 1 in that not more than four planetary gear sets 1 to 4 include at least one double-pinion type planetary gear mechanism, as shown in FIG. 9. Specifically, in multi-speed transmission 100 according to Embodiment 4, third planetary gear set 3 is configured in the form of a double-pinion type planetary gear mechanism.

Third planetary gear 32 of third planetary gear set 3 includes an inner pinion gear and an outer pinion gear. The inner pinion gear meshes with third sun gear 31. The outer pinion gear meshes with third ring gear 33. The inner pinion gear and the outer pinion gear also mesh with each other. The inner pinion gear is spaced inward from third ring gear 33 in the radial direction, and the outer pinion gear is spaced outward from third sun gear 31 in the radial direction. Third planetary carrier 34 supports both the inner pinion gear and the outer pinion gear so that they can rotate about their own axes.

As shown in FIG. 8, third planetary carrier 34 is configured to rotate integrally with third intermediate coupling member 83. Specifically, third planetary carrier 34 is fixed to third intermediate coupling member 83. Third planetary carrier 34 and third intermediate coupling member 83 may be formed of a single member. Third intermediate coupling member 83 couples second planetary carrier 24 of second planetary gear set 2 to third planetary carrier 34 of third planetary gear set 3. Second planetary carrier 24 and third planetary carrier 34 are configured to rotate integrally with each other.

Second clutch 52 is configured to selectively couple third ring gear 33 of third planetary gear set 3 to first intermediate coupling member 81. Second clutch 52 is configured to selectively couple third ring gear 33 to first sun gear 11, second ring gear 23 and fourth sun gear 41.

When engaged, second clutch 52 couples third ring gear 33 to first sun gear 11, second ring gear 23 and fourth sun gear 41 through first intermediate coupling member 81. Thus, third ring gear 33, first sun gear 11, second ring gear 23 and fourth sun gear 41 rotate integrally. When released, second clutch 52 releases the coupling between third ring gear 33 and first intermediate coupling member 81. Thus, third ring gear 33 can rotate relative to first sun gear 11, second ring gear 23 and fourth sun gear 41.

Third clutch 53 is configured to selectively couple third ring gear 33 of third planetary gear set 3 to fourth intermediate coupling member 84. Third clutch 53 is configured to selectively couple third ring gear 33 to fourth planetary carrier 44 of fourth planetary gear set 4.

When engaged, third clutch 53 couples third ring gear 33 to fourth intermediate coupling member 84. When engaged, third clutch 53 couples third ring gear 33 to fourth planetary carrier 44 through fourth intermediate coupling member 84. Thus, third ring gear 33 and fourth planetary carrier 44 rotate integrally. When released, third clutch 53 releases the coupling between third ring gear 33 and fourth intermediate coupling member 84. Thus, third ring gear 33 and fourth planetary carrier 44 can rotate relative to each other.

By selectively engaging first to third clutches 51 to 53 and first to third brakes 61 to 63 to control the rotation of the rotational elements of first to fourth planetary gear sets 1 to 4 in a manner similar to FIG. 2, multi-speed transmission 100 of Embodiment 4 configured in this manner can also implement ten forward gear ratios and two reverse gear ratios. Multi-speed transmission 100 of Embodiment 4 can also produce the effect of reducing the variation in the step ratios of multi-speed transmission 100 in a manner similar to Embodiment 1.

Multi-speed transmission 100 of the embodiments described above can be used for any machine equipped with a multi-speed transmission, and is particularly applicable to a construction machine and a mining machine such as a dump truck.

It should be understood that the embodiments disclosed herein are illustrative and non-restrictive in every respect. The scope of the present invention is defined by the terms of the claims rather than the description above, and is intended to include any modifications within the scope and meaning equivalent to the terms of the claims.

REFERENCE SIGNS LIST 1 first planetary gear set; 2 second planetary gear set; 3 third planetary gear set; 4 fourth planetary gear set; 7 input member; 9 housing; 10 output member; 11 first sun gear; 12 first planetary gear; 13 first ring gear; 14 first planetary carrier; 21 second sun gear; 22 second planetary gear; 23 second ring gear; 24 second planetary carrier; 31 third sun gear; 32 third planetary gear; 33 third ring gear; 34 third planetary carrier; 41 fourth sun gear, 42 fourth planetary gear, 43 fourth ring gear, 44 fourth planetary carrier, 51 first clutch; 52 second clutch; 53 third clutch; 61 first brake; 62 second brake; 63 third brake; 81 first intermediate coupling member; 82 second intermediate coupling member, 83 third intermediate coupling member, 84 fourth intermediate coupling member, 100 multi-speed transmission; O rotational axis.

The invention claimed is:
1. A multi-speed transmission comprising:
an input member;
an output member;
not more than four planetary gear sets including a first planetary gear set, a second planetary gear set, a third planetary gear set and a fourth planetary gear set that are arranged in order in an axial direction from the input member toward the output member, each of the planetary gear sets including a sun gear, a planetary carrier, and a ring gear;
an intermediate coupling member that couples the sun gear of the first planetary gear set, the ring gear of the second planetary gear set, and the sun gear of the fourth planetary gear set to one another; and
not more than six control elements, wherein
each of the not more than six control elements is operatively coupled to at least one planetary gear set of the not more than four planetary gear sets, and selectively engageable to produce a set of different gear ratios between the input member and the output member, the set of different gear ratios including at least ten forward gear ratios and at least two reverse gear ratios, and
one control element of the not more than six control elements selectively couples the sun gear of the third planetary gear set to the planetary carrier of the fourth planetary gear set.
2. The multi-speed transmission according to claim 1, wherein
the input member is coupled to the sun gear of the third planetary gear set.

3. The multi-speed transmission according to claim 2, wherein
the output member is coupled to the ring gear of the fourth planetary gear set.

4. Multi-speed transmission according to claim 3, wherein
another control element of the not more than six control elements brakes rotation of the planetary carrier of the fourth planetary gear set.

5. The multi-speed transmission according to claim 1, wherein
another control element of the not more than six control elements selectively couples the planetary carrier of the third planetary gear set to the intermediate coupling member.

6. The multi-speed transmission according to claim 3, wherein
another control element of the not more than six control elements brakes rotation of the ring gear of the first planetary gear set and the sun gear of the second planetary gear set.

7. The multi-speed transmission according to claim 3, further comprising an intermediate coupling member that couples the planetary carrier of the second planetary gear set to the ring gear of the third planetary gear set.

8. A multi-speed transmission comprising:
an input member;
an output member;
not more than four planetary gear sets including a first planetary gear set, a second planetary gear set, a third planetary gear set and a fourth planetary gear set that are arranged in order in an axial direction from the input member toward the output member, each of the planetary gear sets including a sun gear, a planetary carrier, and a ring gear;
an intermediate coupling member that couples the sun gear of the first planetary gear set, the ring gear of the second planetary gear set, and the sun gear of the fourth planetary gear set to one another; and
not more than six control elements, wherein
each of the not more than six control elements is operatively coupled to at least one planetary gear set of the not more than four planetary gear sets, and selectively engageable to produce a set of different gear ratios between the input member and the output member,
the input member is coupled to the sun gear of the third planetary gear set,
the output member is coupled to the ring gear of the fourth planetary gear set,
a first control element of the not more than six control elements selectively couples the sun gear of the third planetary gear set to the planetary carrier of the fourth planetary gear set, and
a second control element of the not more than six control elements brakes rotation of the planetary carrier of the fourth planetary gear set.

9. A multi-speed transmission comprising:
an input member;
an output member;
a first planetary gear set including a first sun gear, a first planetary gear, a first ring gear, and a first planetary carrier;
a second planetary gear set including a second sun gear, a second planetary gear, a second ring gear, and a second planetary carrier;
a third planetary gear set including a third sun gear coupled to the input member, a third planetary gear, a third ring gear, and a third planetary carrier;
a fourth planetary gear set including a fourth sun gear, a fourth planetary gear, a fourth ring gear coupled to the output member, and a fourth planetary carrier;
a first intermediate coupling member that couples the first sun gear, the second ring gear, and the fourth sun gear to one another;
a second intermediate coupling member that couples the first ring gear to the second sun gear;
a third intermediate coupling member that couples the second planetary carrier to the third ring gear;
a first clutch that selectively couples the third sun gear to the fourth planetary carrier;
a second clutch that selectively couples the third planetary carrier to the first intermediate coupling member;
a third clutch that selectively couples the third planetary carrier to the fourth planetary carrier;
a first brake that brakes rotation of the second intermediate coupling member;
a second brake that brakes rotation of the first planetary carrier; and
a third brake that brakes rotation of the fourth planetary carrier.

* * * * *